United States Patent Office 3,200,150
Patented Aug. 10, 1965

3,200,150
PROCESS FOR THE PREPARATION OF AMIDES
John D. Pollard and Edward F. Orwoll, Baltimore, Md., assignors to FMC Corporation, New York, N.Y., a corporation of Delaware
No Drawing. Filed May 2, 1962, Ser. No. 191,715
5 Claims. (Cl. 260—562)

This invention relates to a process for producing amides from amines and organic acids.

The treatment of stoichiometric mixtures of aromatic amines and organic acids in a liquid phase with $PCl_3$ is one of the earlier known procedures for obtaining the corresponding amide. The reported yields of amides by this method, however, are relatively low, of the order of 50%.

It was thereafter found that the presence of an acid acceptor improved the yields to over 70% based on the organic acid. Alkyl amines or a large excess of the aromatic amine reactant were employed as the acceptor. In the latter case, using about 5 moles of aromatic amine to 2 moles of carboxylic acid and 1 mole of $PCl_3$, 3 moles of the amine were used merely to take up the hydrogen chloride evolved in the reaction. However, amines are so expensive that the recovery of a substantial amount of the amine acid acceptor is essential for such processes to have any commercial advantage. Further processing to recover the amine requires not only additional steps but additional costs in equipment and processing time; and quite often complete amine recovery cannot be made.

It is the major object of this invention to furnish a process of preparing amides in high yields from stoichiometric quantities of amines and carboxylic acids.

It is a further object to prepare amides in high yields without using an acid acceptor.

These and other objects will become apparent from the following disclosure.

It has now been discovered that organic amides can be prepared in unexpectedly high yields by the step-wise process of first reacting an amine and from 0.35–0.6 mole of phosphorous trichloride per mole of amine in an inert liquid hydrocarbon, then adding a carboxylic acid to the reaction mixture and elevating the temperature to complete the reaction, and finally recovering the amide product from the liquid phase.

According to the method of this invention, the amine is mixed with an inert organic solvent for the amide to be produced, preferably at room temperature, and then about 0.35 to 0.6, and preferably 0.4 to 0.5 mole, of phosphorous trichloride per mole of amine is added. There should be sufficient solvent present to obtain a fluid-like slurry of the reaction mixture under moderate stirring.

At this intermediate stage of the process, the mixture may be heated, but preferably without causing reflux of the liquid mixture or evolution of hydrogen chloride, although such evolution of the gas will not affect operation of the process. Temperatures may thus range from room temperature to the reflux temperature of the mixture. An approximately stoichiometric amount of a carboxylic acid based on the amine originally introduced is then added to the reaction mixture and the temperature of the mixture raised to reflux. The slight exotherm caused by the amidization reaction is not sufficient to require temperature control. The progress of the amidization reaction is readily followed by collecting the hydrogen chloride evolved in standard sodium hydroxide solution.

When the evolution of hydrogen chloride is almost complete, a sticky, reddish precipitate of meta-phosphorous acid forms. Upon completion of the reaction when no further gas evolution is detected, a clear supernatant liquid containing the amide and solvent is formed while the phosphorous acid remains as a viscous semi-solid. The liquid phase is easily separated from the precipitate by decanting or by filtration or by other known methods.

The liquid phase is then neutralized and washed with water and the amide is separated from the solvent by known methods. Further purification of the amide may be performed if desired.

As stated earlier, stoichiometric amounts of amine and carboxylic acid may be reacted to obtain unexpectedly high yields of amide when low molar ratios of amine to phosphorous trichloride are employed. These ratios are in the range of 1.5 to 3.0 to 1 instead of the 5 to 1 ratio previously employed. Yet the yields range from about 70% to almost 90%, a surprising result in view of the known methods of preparing amides.

Suitable amines include aromatic amines, such as aniline, chloroaniline, dichloroaniline, and chloro-methyl-aniline; aliphatic amines, such as butylamine; and cycloaliphatic amines such as cyclohexylamine. Most monobasic or dibasic, carboxylic acids may be used, whether aliphatic or aromatic, and they made be either saturated or unsaturated.

Almost any inert organic solvents can be used. However, hydrocarbons including the aromatic solvents, such as benzene, toluene, xylene, and specific aliphatic solvents, such as petroleum naphtha, are most effectively employed for establishing satisfactory reflux conditons and for solubilizing the amide.

Although the ratio of solvent to amine is not critical, it has been found that if the dilution of amine in the initial mixture is between about one part by weight of amine in 4 to 6 parts of solvent, the conditions of the reaction steps are most readily controlled. For example, in the early stages of the reaction, a bulky precipitate of the amine hydrochloride is initially formed and requires a diluent for efficient mixing with the other reactants. Also, the complete release of hydrogen chloride in the second reaction will depend to some extent upon sufficient reflux so that an adequate amount of liquid is desirable. The solvent has as a main function that of keeping the amide in the liquid phase when the meta-phosphorous acid precipitates. Thus, enough solvent should be present to solubilize the final product and cause a clear separation from the solid by-product.

The preferred molar ratio of phosphorous trichloride to amine is in the range of about 0.4 to 0.5, as discussed above. The acid-amine ratio is preferably stoichiometric, although the range of acid employed may be from 0.9 to 1.20 moles of acid per mole of amine.

By following the above outlined conditions, the total reaction may take from 0.5 hour to 2.5 hours. Part of this time may be utilized in adding the reactants, although time of addition is not critical. The acid addition is made carefully and could take from 5 to 15 minutes if necessary, depending upon the amount of solvent and the type of acid to be mixed. The time of addition, however, is not critical for either reactant. Only moderate heating is required for the second reaction; the exotherm can maintain the temperature at the desired level.

Ordinary separation methods may be employed to recover the amide from the final reaction mixture. The solvent layer may be separated from the meta-phosphorous acid by simply decanting it off. The meta-phosphorous acid phase may be washed with more solvent if desired to recover any amide or unreacted amine. The solvent layer is neutralized by alternatively washing with mild aqueous alkali to remove traces of phosphorous acid and with dilute aqueous acid to remove unconverted amine.

The amide is recovered from the washed liquid phase by any convenient method, e.g., by steam distillation of the solvent; or the amide can be crystallized out of solution by cooling. The solid amide may be further purified by subsequent known purification steps if desired.

However, in general, the product obtained by this process is directly suitable for commercial application.

The process outlined above provides organic amides in yields of almost 90%, based on the amine, with little or no loss of expensive amines. The amides preferred in this invention, although other classes of amides may be obtained thereby, are derivatives of the aromatic amines, or the anilides, which are important active ingredients in insecticide and herbicide formulations. The following examples are directed to preparing these types of compounds, although it is understood that these specific compounds are merely representative of the general class of amides.

*Example 1*

In this example, 62.2 parts of 3-chloro-4-methylaniline was dissolved in 240 parts of toluene, and 26 parts of $PCl_3$ added with agitation. The resulting slurry was heated to 80° C. and 51 parts of 2-methylpentanoic acid was added over a period of 10–15 minutes. The mixture was heated to about 102–105° C., at which point a vigorous evolution of gases took place. Within about half an hour, a deposition of insoluble meta-phosphorous acid occurred. The temperature of the reaction mixture gradually rose to 113–114° C. as gas evolution diminished.

After heating at this temperature for 1 hour, the reaction mixture was cooled to 80° C., decanted from the precipitated meta-phosphorous acid, and the hot toluene solution washed with 80 parts of 5% sodium hydroxide solution, 80 parts of 5% hydrochloric acid solution and several 80-part portions of water until the wash water was substantially neutral. The washed toluene solution was steam-distilled to remove the solvent, and the residual product, after vacuum-stripping to remove water, amounted to 92 parts, or 87% of theory, based on the aniline. The dry product melted at 80–82° C.

*Example 2*

To a solution containing 56.4 parts of 3-chloro-4-methylaniline dissolved in 320 parts of naphtha was added 23.4 parts of $PCl_3$ with vigorous stirring. The resulting slurry was heated to 80° C., and 46.4 parts of 2-methylpentanoic acid was added over a 10 minute period. The mixture was heated at 114–117° C. for 1 hour and at 128–130° C. for half an hour.

The clear, hot solvent solution was decanted from the precipitated meta-phosphorous acid, and washed at 80° C. successively with 80 parts of 5% sodium hydroxide solution, 80 parts of 5% hydrochloric acid solution and 80-part portions of water until the wash water was substantially neutral. The washed solvent solution was cooled to 20° C., and the crystallized product filtered off and air-dried. The product amounted to 77 parts, and represented an 80% yield calculated on the aniline originally used. It melted at 80–83° C.

*Example 3*

To a solution of 64.8 parts of 3,4-dichloroaniline in 320 parts of toluene was added 23.4 parts of $PCl_3$ over a 5-minute period. The mixture was heated to 80° C., and 40 parts of glacial methacrylic acid was added over a 5-minute period. Maintaining vigorous stirring, the reaction mixture was heated at 103–105° C. for 1 hour and refluxed at a reaction mixture temperature of 112–113° C. for an additional hour.

The reaction mixture was cooled to 74° C. and thoroughly mixed with 65 parts of 30% sodium hydroxide to dissolve the precipitated meta-phosphorous acid. After removing the lower aqueous layer, the upper solvent-product layer was washed at 75–80° C. successively with 25 parts of 30% sodium hydroxide solution, 100 parts of 5% hydrochloric acid solution and three 80-part portions of water. The washed toluene solution was cooled to 15° C. and the crystalline product was filtered off and air-dried. Seventy-one parts of substantially colorless crystalline product, melting at 121–123° C., was obtained. This amounted to a yield of 77%, calculated on starting aniline.

*Example 4*

A slurry containing 32.4 parts of 3,4-dichloroaniline and 13.7 parts of $PCl_3$ added over a 15 minute period in 150 parts of toluene was heated to 80° C., and 26.7 parts of 2-methylpentanoic acid was added during 15 minutes. The mixture was heated at 102–105° C. for 1 hour, and at 112–114° C. for 1.5 hours.

The clear toluene solution was decanted from precipitated meta-phosphorous acid and washed successively at 75–80° C. with 40 parts of 5% hydrochloric acid, 80 parts of 5% sodium hydroxide and 120 parts of water containing 5 drops of hydrochloric acid. The washed toluene solution was steam-distilled to remove about 75 parts of toluene, and the remaining solution was cooled to 15° C. The crystalline product was filtered from the solvent and air-dried to produce 42.6 parts of amide melting at 99–102° C. This amounted to a yield of about 82%, calculated on starting aniline.

*Example 5*

To solution of 64.8 parts of 3,4-dichloroaniline in 325 parts of toluene was added 23.4 parts of $PCl_3$ over a 15 minute period. The slurry was heated to 80° C., and 52.4 parts of 2-methyl-2-pentenoic acid was added during 15 minutes. The mixture was heated to 105° C., at which temperature a vigorous evolution of gas occurred. After maintaining a reaction mixture temperature of 102–105° C. for 1 hour, the mixture was heated at 112–114° C. for 1 hour and then the toluene solution was decanted from precipitated meta-phosphorous acid.

The toluene solution was washed at 75–80° C. successively with 80 parts of water, 80 parts of 5% hydrochloric acid solution, 80 parts of 5% sodium hydroxide solution and 240 parts of water plus 20 drops of concentrated hydrochloric acid. The washed toluene solution was cooled to 15° C., and the crystalline amide filtered off and air-dried to yield 49 parts of a product melting at 78–80° C. Concentration of the mother-liquor yielded an additional 20 parts of product melting at 77–79° C. A total yield of 68% of amide based on the starting aniline was obtained.

The process of this invention has been disclosed pursuant to patent statutes; however, it is understood that the scope of the invention extends to obvious modifications thereof which may be practiced by those skilled in the art.

We claim:

1. A process for the preparation of an aromatic amide which comprises reacting 1 mole of an aromatic amine of the group consisting of aniline, chloroaniline, dichloroaniline, and chloromethylaniline with 0.35–0.6 mole of phosphorous trichloride in an inert solvent for the aromatic amide product at a temperature in the range from room temperature to the reflux temperature of the reaction medium, and reacting the resulting reaction product with 0.9–1.2 moles of a monobasic aliphatic carboxylic acid at a temperature in the range from moderate heating to the reflux temperature of the reaction medium thereby completely driving off hydrogen chloride.

2. The process of claim 1 in which the aromatic amine is 3,4-dichloroaniline and the carboxylic acid is methacrylic acid.

3. The process of claim 1 in which the aromatic amine is 3-chloro-4-methylaniline and the carboxylic acid is 2-methylpentanoic acid.

4. The process of claim 1 in which the aromatic amine is 3,4-dichloroaniline and the carboxylic acid is 2-methylpentanoic acid.

5. A process for the preparation of an aromatic amide which comprises reacting 1 mole of an aromatic amine selected from the group consisting of aniline, chloroaniline, dichloroaniline, and chloromethylaniline with 0.4–0.5 mole of phosphorus trichloride in the presence of an inert solvent for the aromatic amide product at a temperature in the range from room temperature to the reflux temperature of the reaction medium, and reacting the resulting reaction product with 0.9–1.2 moles of a monobasic aliphatic carboxylic acid at the reflux temperature of the reaction medium thereby causing hydrogen chloride gas to be released and meta-phophorus acid to be precipitated.

References Cited by the Examiner

UNITED STATES PATENTS 2,384,811    9/45    Coleman et al. _____ 260—562
2,509,594    5/50    Grimmel et al. _____ 260—295.5

OTHER REFERENCES

Klosa: Chem. Abstracts, volume 49, page 4552 (1955).
Migrdichian: "Orangic Synthesis," volume 1, pages 825–6 (1957).

IRVING MARCUS, *Primary Examiner.*
DUVAL T. McCUTCHEN, *Examiner.*